US008792216B2

(12) United States Patent  
Gajic

(10) Patent No.: US 8,792,216 B2  
(45) Date of Patent: Jul. 29, 2014

(54) METHOD AND ARRANGEMENT FOR CAPACITOR BANK PROTECTION

(71) Applicant: Zoran Gajic, Vasteras (SE)

(72) Inventor: Zoran Gajic, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/743,005

(22) Filed: Jan. 16, 2013

(65) Prior Publication Data

US 2013/0128393 A1    May 23, 2013

Related U.S. Application Data

(63) Continuation of application No. PCT/EP2011/058663, filed on May 26, 2011.

(60) Provisional application No. 61/367,052, filed on Jul. 23, 2010.

(51) Int. Cl.  
    *H02H 7/16*    (2006.01)

(52) U.S. Cl.  
    USPC .......................................................... 361/16

(58) Field of Classification Search  
    CPC ....................................................... H02H 7/16  
    USPC .......................................................... 361/16  
    See application file for complete search history.

(56) References Cited

U.S. PATENT DOCUMENTS

| | | | |
|---|---|---|---|
| 3,859,564 A | 1/1975 | Zulaski | |
| 4,104,687 A | 8/1978 | Zulaski | |
| 4,371,907 A * | 2/1983 | Bignell | 361/82 |
| 4,409,542 A | 10/1983 | Becker et al. | |
| 4,450,497 A * | 5/1984 | Bignell | 361/82 |
| 4,956,739 A | 9/1990 | Becker et al. | |
| 6,211,684 B1 | 4/2001 | McKee et al. | |
| 6,753,792 B2 | 6/2004 | Beckwith | |
| 7,538,684 B2 | 5/2009 | Schnetker | |
| 7,616,005 B2 | 11/2009 | Kalyuzhny et al. | |
| 2006/0007619 A1 * | 1/2006 | Scott et al. | 361/93.1 |

FOREIGN PATENT DOCUMENTS

WO    2006044647 A2    4/2006

OTHER PUBLICATIONS

ISR & Written Opinion of the International Searching Authority Application No. PCT/EP2011/058663 Completed: Oct. 26, 2011; Mailing Date: Nov. 10, 2011 9 pages.

* cited by examiner

*Primary Examiner* — Rexford Barnie  
*Assistant Examiner* — Ann Hoang  
(74) *Attorney, Agent, or Firm* — St. Onge Steward Johnston & Reens LLC

(57) ABSTRACT

A method for protecting against a failure within a multi-phase capacitor bank including a plurality of capacitor units each including a plurality of capacitor elements connected to each other, wherein capacitor units are connected to each other and the failure may involve two neighboring capacitor units. The method includes steps of measuring the current of each individual phase of the capacitor bank, calculating the magnitude of an unbalanced current based on the measured currents, measuring the voltage of each individual phase of the capacitor bank, calculating the magnitude of an unbalanced voltage based on the measured voltages, determining an operating point based on the calculated magnitudes of the unbalanced current and the unbalanced voltage, examining where the defined operating point is located in a specified operating region, and initializing a trip signal based on the location of the defined operating point in the specified operating region.

13 Claims, 4 Drawing Sheets

| Table — Possible pairs of unbalanced quantities for determining an internal CB failure |||
|---|---|---|
| Unbalanced Current | Unbalanced Voltage | Type of Capacitor Bank Design |
| negative sequence current | negative sequence voltage | any capacitor bank |
| zero sequence current | zero sequence voltage | grounded capacitor bank |
| delta phase-to-phase current | delta phase-to-phase voltage | ungrounded capacitor bank |
| delta phase-to-ground current | delta phase-to-ground voltage | directly grounded capacitor bank |

Fig. 4

METHOD AND ARRANGEMENT FOR CAPACITOR BANK PROTECTION

FIELD OF THE INVENTION

The present invention relates to the field of capacitor bank protection. It relates in particular to protect a capacitor bank from a failure. The capacitor bank comprises a plurality of capacitor units each further comprising a plurality of capacitor elements connected in parallel or series, wherein the failure may involve two neighboring capacitor units. Furthermore, a plurality of capacitor units may be arranged in a rack and the capacitor bank comprises a plurality of capacitor racks connected to each other. A failure may involve two neighboring capacitor racks.

BACKGROUND OF THE INVENTION

Capacitor banks, also called shunt capacitor banks, denoted by CB/SCB(s), are installed to improve the quality of an electrical supply and to provide capacitive reactive compensation and power factor correction in a power system by shunting away and concealing current fluctuations from a primary power source. The use of capacitor banks has increased because they are relatively inexpensive, easy and quick to install, and can be deployed almost anywhere in a power grid system. Capacitor bank installations have other beneficial effects on the system such as improvement of the voltage profile, better voltage regulation, reduction of losses and reduction or postponement of investments in the transmission and generation capacity.

A capacitor bank is assembled by a plurality of individual capacitor units. Each individual capacitor unit is a basic building block of a capacitor bank and made up of individual capacitor elements, arranged in parallel/series connected groups, within a steel enclosure. The internal discharge resistor is also included in order to reduce the unit residual voltage after being disconnected from the power system. The capacitor unit used in the power grid system normally includes aluminum foil, paper, or film-insulated cells immersed in a biodegradable insulating fluid and are cased in a metallic container.

Capacitor banks are normally constructed using individual capacitor units connected in series and/or parallel to obtain the required voltage and mega unit of volt amperes reactive ratings, denoted by MVAr. Typically the neighboring capacitor units are installed in racks. Each rack is insulated from each other by insulators.

Outings of a capacitor bank are often caused by accidental contact by animals. Vermin, rodents, cats, birds etc. use the capacitor banks as a resting place or a landing site. When the animal touches the live parts, a flash-over occurs that may result in unnecessary interruptions or consequential damages to the whole bank, unless the bank is sufficiently fitted with protection relays. Moreover, the design of a capacitor bank is adapted to avoid cascading failures although they cannot be completely ruled out.

A cascading failure is a type of series fault, which means that a failure in a capacitor unit results in another failure in a neighboring capacitor unit. Thus, a conventional capacitor bank differential protection will not protect against such failures. When a cascading failure occurs, a fault current drawn from the power grid system can be limited by the impedance of the remaining healthy parts of the capacitor bank, which results that the failure will not be detected by a standard capacitor bank over-current protection until the failure evolves to a number of at least 30-50% of connected units.

An unbalance protection which is typically available within capacitor bank protection scheme is designed to detect element failure within a unit. It however often reacts too slow and/or can even be completely disarmed by quite high level of the unbalance quantity caused by a cascading failure between two capacitor units or two capacitor racks.

Failure to provide adequate protection for such series unbalance fault within the shunt capacitor bank may lead to one or more of the following situations: excessive damage to the capacitor bank; adverse system effects; spread of damage to adjacent equipment; excessive period when the damaged equipment is unavailable; and possible capacitor unit casing rupture and undesirable discharge of dielectric liquid and/or fire.

Therefore, a protection scheme against a cascading failure between two neighboring capacitor units/racks is highly desired.

SUMMARY OF THE INVENTION

One object of the present invention is to provide a method for protecting a capacitor bank from an internal failure that involves two neighboring capacitor units within the capacitor bank.

This object is achieved by a protection method, characterized in that the method comprises steps of measuring the current of each individual phase of the capacitor bank, calculating the magnitude of an unbalanced current $I_{unbalanced}$ based on the measured currents, measuring the voltage of each individual phase of the capacitor bank, calculating the magnitude of an unbalanced voltage $U_{unbalanced}$ based on the measured voltages, determining an operating point $U_{unbalanced}$, $I_{unbalanced}$ based on the calculated magnitudes of the unbalanced current and the unbalanced voltage, examining where the defined operating point is located in a specified operating region and initializing a trip signal based on the location of the defined operating point in the specified operating region.

By determining whether the operating point consisting of an unbalance voltage and an unbalance current is located in the specified operating region, an internal failure within the capacitor bank, for example between capacitor units is distinguished from a failure external to the capacitor bank.

In the case that a plurality of capacitor units are arranged in a rack and the capacitor bank comprises a plurality of capacitor racks connected to each other, the method can be also applicable to protect the capacitor bank from failures occurring between two neighboring capacitor racks.

Another object of the present invention is to distinguish an internal failure from an external failure. This is achieved by defining a limit line in an operating plane.

According to one embodiment of the invention, the specified operating region is a part of the operating plane defined by the first quadrant of a two-dimension Cartesian coordinate system having X and Y axes representing unbalanced voltage and current, the operating plane is divided into a restraining region and the specified operating region by the limit line, in the case that the defined operating point is in the restraining region, no trip signal is initialized. The limit line represents an operating characteristic by which an external failure and an internal failure are distinguished. In particular, the limit line distinguishes an internal failure between capacitor units/ racks from a failure that occurs externally.

The limit line can be defined on the basis of the rated current and voltage of the capacitor bank in the two-dimension Cartesian coordinate system, wherein the X-axis of the operating plane defined by percent of the magnitude of the rated voltage of the capacitor bank and the Y-axis of the operating plane defined by percent of the magnitude of the rated current. The limit line may further include a part of a straight line extending through the origin of the plane with a slope of 1, which means that the straight line part is a 45 degree rising line.

Practically, the limit line is specified so that the operating region has a distance to the origin of the coordinate system so that if the operating point is too close to the origin it will be ignored. On the other hand, if the determined operating point includes an unbalanced voltage that exceeds the rated voltage of the capacitor bank in a certain degree, for example 120%, the determined operating point will be left un-reacted. This is based on the general design rule of capacitor banks.

According to one embodiment of the invention, the unbalanced current is any of following unbalanced quantities: negative sequence current, zero sequence current or $\Delta I = I_{max} - I_{min}$, wherein the unbalanced voltage is any of following unbalanced quantities: negative sequence voltage, zero sequence voltage or $\Delta U = U_{max} - U_{min}$ and, the operating point $U_{unbalanced}, I_{unbalanced}$ is defined by the unbalance quantities in the same category. This means that if a negative sequence current is calculated as the unbalanced current, a corresponding negative sequence voltage should be calculated as the unbalanced voltage so that the operating point is defined. This principle is applicable to other two unbalanced quantity categories. Application of an unbalanced quantity category may depend on how the grounding system of a capacitor bank is designed. For example, if a capacitor bank is ungrounded, the current and voltage of a negative sequence can be used to detect a failure within the capacitor bank. While for a grounded capacitor bank, either current and voltage of a negative sequence or current and voltage of a zero sequence can be chosen for such internal failure detection.

According to another embodiment of the invention, the method further comprises the steps of defining a no-action region within the operating region and adjacent to the limit line, defining a first sensitive region within the operating region and adjacent to the no-action region and initializing a trip signal with a first time delay in the case that the operating point is located in the first sensitive region.

According to yet another embodiment of the invention, the method further comprises the steps of defining a second sensitive region within the operating region and adjacent to the first sensitive region and initializing a trip signal with a second time delay shorter than the first time delay in the case that the operating point is located in the second sensitive region.

By defining the no-action region, the first sensitive region and the second sensitive region, the invention improves granularity of sensitivity and reduces maloperations.

Preferably, the first time delay is in a range of 100-300 ms and the second time delay is in a range of 20-50 ms.

The object of the invention is also achieved by an arrangement for protecting against a failure. Such an arrangement comprises a current transformer arranged to measure the current flowing through each individual phase of the capacitor bank, a voltage transformer arranged to measure the voltage of each individual phase of the capacitor bank, a computing unit configured to calculate the magnitude of an unbalanced current $I_{unbalanced}$ based on the measured currents and calculate the magnitude of an unbalanced voltage $U_{unbalanced}$ based on the measured voltages, and a protective unit configured to determine an operating point $U_{unbalanced}, I_{unbalanced}$ based on the calculated magnitudes of the unbalanced current and the unbalanced voltage, examine where the operating point is located in a specified operating region and initialize a trip signal based on the location of the defined operating point in the specified operating region.

According to one embodiment of the invention, the protective unit is further configured to define a no-action region within the operating region and adjacent to the limit line, define a first sensitive region within the operating region and adjacent to the no-action region and initialize a trip signal with a first time delay in the case that the operating point is located in a first sensitive region.

Furthermore, the protective unit is configured to define a second sensitive region within the operating region and adjacent to the first sensitive region and in the case that the operating point is located in the second sensitive region, the protective unit will initialize a trip signal with a second time delay shorter than the first time delay to avoid a heavier failure.

BRIEF DESCRIPTION OF THE DRAWINGS

The invention will now be explained more closely by the description of different embodiments of the invention and with reference to the appended figures.

FIG. 4 lists possible pairs of unbalanced quantities which can be used for protecting an internal failure in a capacitor bank.

DETAILED DESCRIPTION OF THE INVENTION

Figure 1:
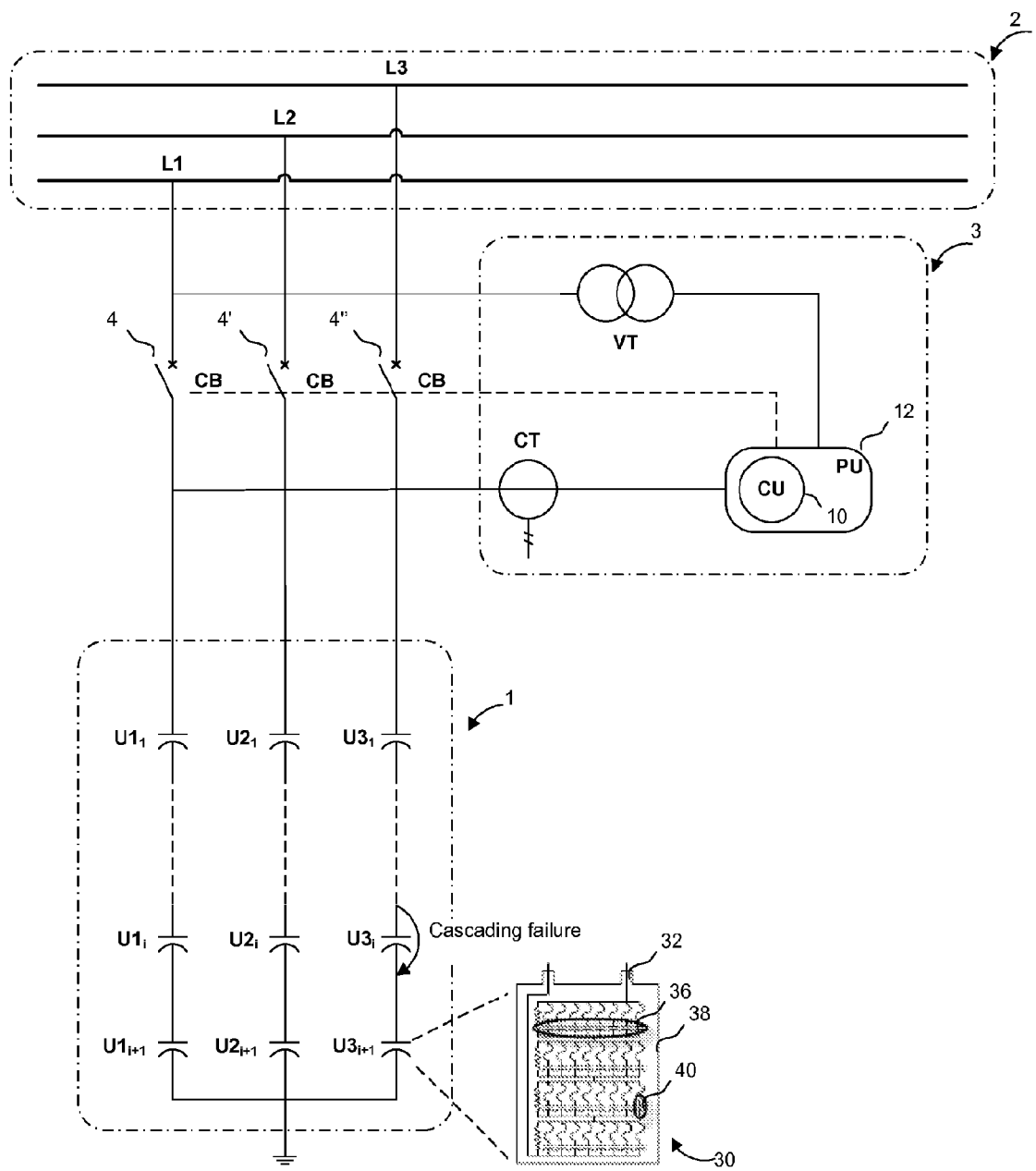
FIG. 1 illustrates a schematic diagram of an arrangement to protect a multi-phase capacitor bank from an internal failure involving two neighboring capacitor units, according to one embodiment of the invention.

FIG. 1 illustrates a schematic diagram of an arrangement 3 for protecting a three-phase L1, L2, L3 capacitor bank 1 from an internal failure involving two neighboring capacitor units, according to one embodiment of the invention.

Figure 2:
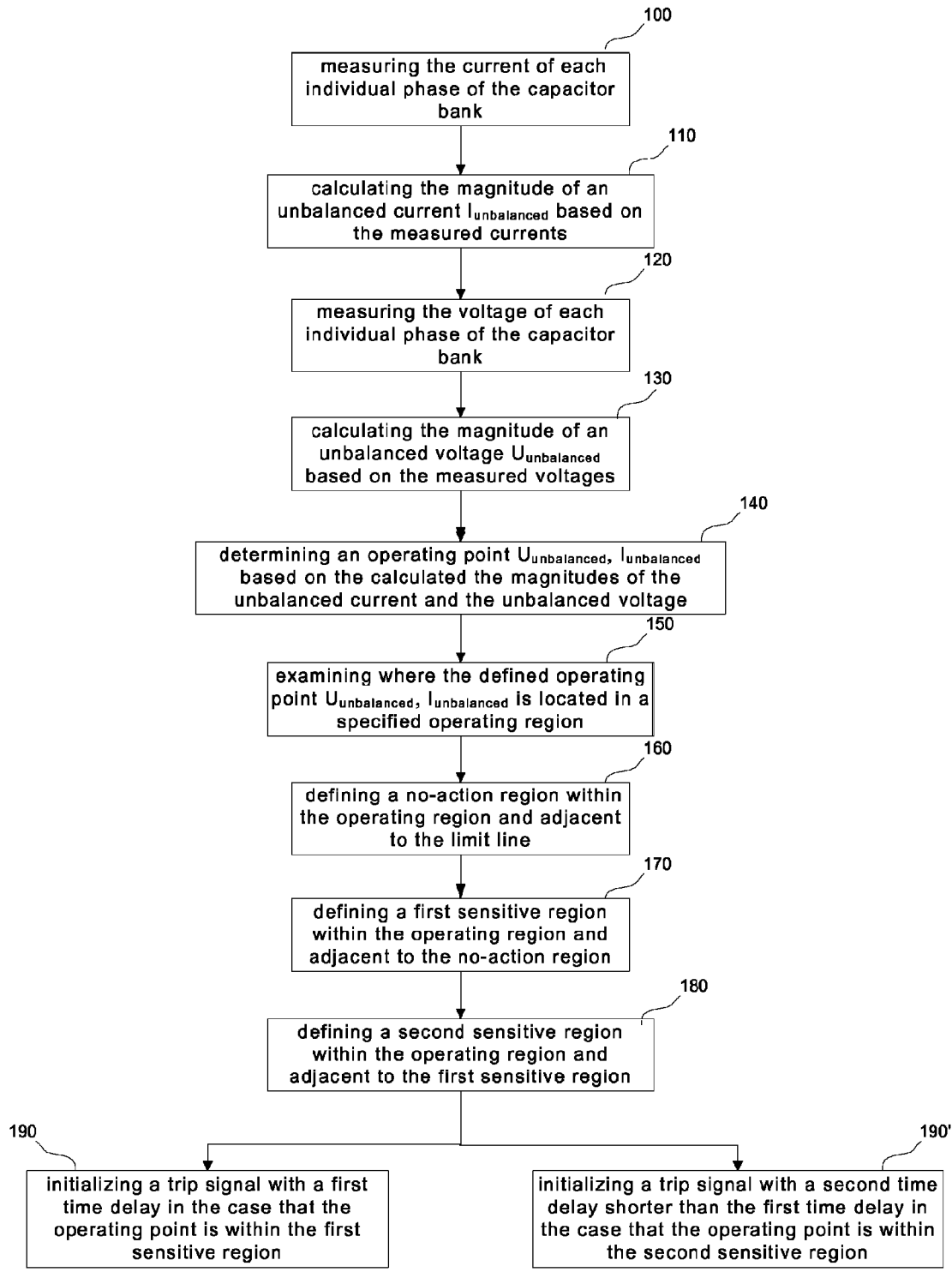
FIG. 2 shows a flow chart of the invented method to protect a multi-phase capacitor bank from an internal failure involving two neighboring capacitor units.

FIG. 2 shows a flow chart of the invented method to protect a multi-phase capacitor bank from an internal failure involving two neighboring capacitor units. With reference to FIG. 2, each of steps in the figure will be described accordingly when FIG. 1 is explained.

The capacitor bank is wye-connected at a ground point and includes series-connected capacitor units $U1_1, \ldots, U1_i, U1_{i+1}, U2_1, \ldots, U2_i, U2_{i+1}, U3_1, \ldots, U3_i, U3_{i+1}$ per phase. In this example, the capacitor bank is connected to a power connection line 2 in a power grid system for improving the quality of an electrical supply and to provide capacitive reactive compensation and power factor correction in the power system. Each of capacitor units may comprise a plurality of capacitor elements arranged in parallel or series connected groups. Fuses are normally used for protecting the capacitor units and its location and can be arranged inside a capacitor unit on each element or outside the units.

Each 30 of capacitor units is sealed in a metallic container/casing 38 and includes two bushing 32, 32'. In this example, the capacitor unit 30 is internally fused, meaning that each 40 of the capacitor elements is fused inside the capacitor unit, and comprises a plurality of capacitor elements connected in parallel in groups 36. Each of the fuses is a simple piece of wire used to limit the current and encapsulated in a wrapper that is able to withstand the heat produced by the arc. Upon a capacitor element failure, the fuse removes the affected element only. The other elements, connected in parallel in the same group, remain in service but with a slightly higher voltage across them.

It should be understood that there are various capacitor bank configurations/layouts. The invention is also applicable to other types of designs, for example, multiple units grounded double wye, multiple units ungrounded single/double wye or delta-connected and capacitor units in all the above-mentioned types may be series or parallel connected with internally or externally fused protection.

In this example, a circuit breaker 4, 4', 4" is arranged in each of the phases for protecting the power connection line 2 from damage caused by for example short circuit due to a cascading failure or other types of faults of the capacitor bank.

The arrangement 3 includes a current transformer CT, a voltage transformer VT and a protective unit 12 including a computing unit 10. The current transformer CT is connected between each individual phase L1, L2, L3 of the capacitor bank and the protective unit to the power connection line and is arranged to supple a reduced current so that the current flowing through each individual phase of the capacitor bank can be measured by the protective unit, step 100. The voltage transformer VT is connected between each individual phase of the capacitor bank and the protective unit and is used to transform voltages down to a measurable level so the voltage in each L1, L2, L3 of the phases can be measured, step 120.

The measured currents and voltages are communicated to the protective unit and thereby, the computing unit 10 is able to calculate the magnitudes of an unbalanced current $I_{unbalanced}$ and an unbalanced voltage $U_{unbalanced}$, steps 110 and 130. The computing means can be implemented as a software module. The computing unit 10 further comprises hardware for running the software module. The hardware of the computing unit can be, for example, a micro-computing processor, a digital signal processor, a field-programmable gate array, or a standard computer.

Because the failure results in an unbalanced system, the theory of symmetrical components can be used to determine the location of the failure so that a failure external to the capacitor bank can be distinguished from an internal failure occurring inside the capacitor bank.

The theory of symmetrical components states that source of negative and zero sequence quantities is located in the point of failure.

For an unbalanced failure external to the capacitor bank, since the source of the failure is located externally, the impedance of the system will be much greater than the impedance of the capacitor bank, which means that, for a healthy/balanced capacitor bank, the impedance of the capacitor bank will remain constant.

It is shown that the positive and negative sequence impedances of the capacitor bank always have the same value as the capacitor bank impedance, while the zero sequence impedance may depend on how the capacitor is grounded at its neutral point. If the capacitor bank is solidly grounded, then even the zero sequence impedance has the same value as the capacitor bank impedance.

Therefore, the negative sequence current and voltage of the capacitor bank can be calculated by the impedance $X_{CB}$ of the capacitor bank that will remain constant under an external unbalanced failure. This is also valid for the zero sequence quantities if the capacitor bank is grounded.

The impedance of the capacitor bank can be determined by the required MVAr rating of the capacitor bank and the voltage level of the power system. For a three-phase capacitor bank, this impedance can be calculated by the following formula, $$X_{CB}[\Omega] = \frac{U^2}{Q_{CB}[MVAr]}$$

wherein, $X_{CB}$ is the impedance of the capacitor bank, U is the rated voltage of the system and $Q_{CB}$ is the MVar rating of the capacitor bank.

However, if a failure occurs within the capacitor bank, the impedance of the capacitor bank will be much greater than the impedance of the system. Moreover, the impedances of positive, negative and zero sequences will not remain constant anymore. By determining such an unbalanced point formed by the calculated unbalanced voltage and current, which indicates whether the negative sequence impedance remains still constant or not, an internal failure is distinguishable from an external failure. Zero sequence impedance can be used if the capacitor bank is grounded.

The above principle is also valid for delta quantities during unbalance conditions. Assuming that an internal failure is located only with one phase of the capacitor bank, the delta quantities can be determined by looking into a difference between maximum and minimum phase-to-phase quantities for an ungrounded capacitor bank or a difference between maximum and minimum phase-to-ground quantities for a directly grounded capacitor bank.

When the capacitor bank is designed, the minimum number of capacitor units connected in parallel is designed, as a general rule, such that isolation of one capacitor bank in a group should not cause a voltage unbalance sufficient to place more than for example, 120% of rated voltage on the remaining capacitors of the group and the minimum number of series connected groups is that in which the complete bypass of the group does not subject the others remaining in service to a permanent overvoltage of more than, for example 120%. This design rule provides that voltage can be used as a restrained characteristic and the impedance of the capacitor bank can be used as a protection operating principle for distinguishing all external failures from internal capacitor bank failures.

By using this operating principle, the protective unit 12 can determine whether the formed operating point $U_{unbalanced}$, $I_{unbalanced}$, step 140, is located in a specified operating region or not, step 150.

For determining an internal failure within the capacitor bank, in particular a failure between two neighboring capacitor units/racks, several pairs of unbalanced quantities can be used and the application of which one is used depends on how a capacitor bank is grounded. FIG. 4 summarizes possible pairs of an unbalanced current and an unbalanced voltage pair which can be used for voltage restrained principle in order to protect against an internal cascading failure between two neighboring capacitor units/racks.

The protective unit 12 can be further configured to define a no-action region and two sensitive regions, steps 160, 170 and 180, to further refine the granularity of the operating to provide a better balance between stability and security.

Figure 3:
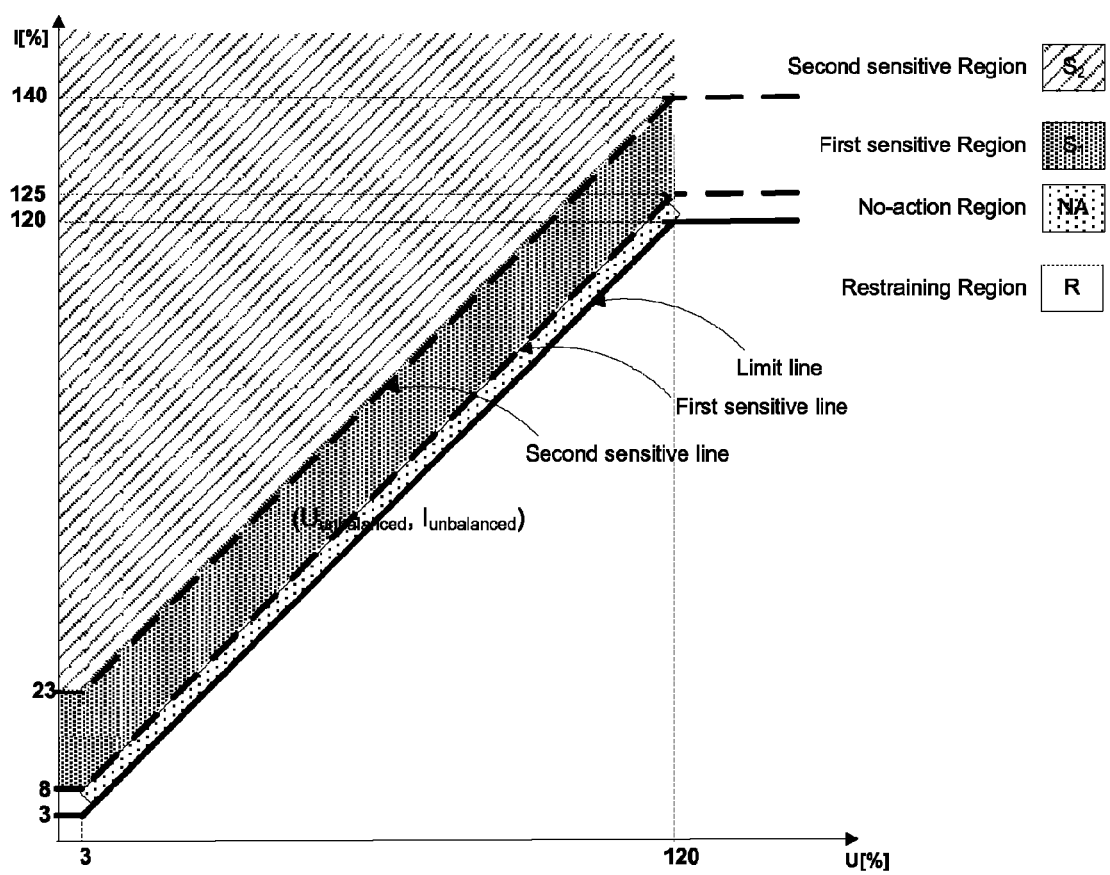
FIG. 3 illustrates an operating plane defined in a two-dimension Cartesian coordinate system, wherein a limit line is used to distinguish an internal failure within a capacitor bank from an external failure occurring outside of the capacitor bank, according to another embodiment of the invention.

FIG. 3 illustrates an operating plane defined by a two-dimension Cartesian coordinate system, wherein the X-axis of the operating plane defined by percent of the magnitude of the rated voltage of the capacitor bank and the Y-axis of the operating plane defined by percent of the magnitude of the rated current and, a limit line represents an external failure characteristic defined as the impedance of the capacitor bank and is used to distinguish an internal failure inside the capacitor bank from an external failure occurring outside the capacitor bank. As shown in FIG. 3, voltage is used as a restrained characteristic for the capacitor bank protection and the limit line includes a straight 45 degree rising line and two cut-off lines such that if the operating point includes an unbalanced voltage either too close to the origin or exceeding the rated voltage of the CB in a certain degree, no operation will be performed. Preferably the first cut-off line may be defined by 3-5% of the rated voltage and the second cut-off line may be defined by 110-130% of the rated voltage based on the general design rule of capacitor banks. The straight line indicates whether the impedance of an unbalanced quantity is remained constant or not. If the unbalanced point is located below the straight line, the impedance of an unbalanced quantity, for example the negative sequence impedance, is still remained constant and a failure external to the capacitor bank occurs; otherwise, it indicates that the impedance varies and therefore, an internal failure occurs.

With reference to FIG. 3, the above described operating principle shows also that the current pickup is lowered in proportion to the measured voltage.

The operating plane is divided into a restraining region R, an operating region by the limit line. The operating region is further divided into three sensitive regions: no-action region NA, a first sensitive region $S_1$ and a second sensitive region $S_2$ by the limit line, a first sensitive line and a second sensitive line.

As shown in FIG. 3, the no-action region is adjacent to the limit line with a very short distance defined by the first sensitive line in order to avoid unnecessary protection operations. The first sensitive region is adjacent to the no-action region and defined by the first and second sensitive lines. Preferably, the first sensitive line is set above 4-7% from the limit line and the second sensitive line is set 20-40% above the limit line. In this example, the first sensitive line is set above 5% from the limit line, the second sensitive line is set above 20% from the limit line and an operating point defined by an unbalanced voltage $U_{unbalanced}$ and an unbalanced current $I_{unbalanced}$ is located in the first sensitive region.

These two sensitive regions represent different sensitivities of protection operations. Because the first sensitive region is closer to the limit line than the second sensitive region, it is more sensitive than the second sensitive region. Therefore, a protection operates within a longer time delay to avoid a maloperation.

With the above defined regions, the protective unit 12 is further configured to initialize a trip signal with a first time delay in the case that the operating point is located in the first sensitive region or initialize a trip signal with a second time delay shorter than the first time delay in the case that the operating point is located in the second sensitive region, step 190 or 190'. Preferable ranges for the first and second time delays are 100-300 ms and 20-50 ms respectively. The trip signal is sent to the circuit breaker 4, 4', 4" that in turn disconnects the capacitor bank from the grid system so that other electric devices in the system will not be affected.

What is claimed is:

1. A method for protecting against a failure within a multi-phase capacitor bank comprising a plurality of capacitor units each comprising a plurality of capacitor elements connected to each other, wherein capacitor units are connected to each other, the method comprising the steps of:

measuring a current of each individual phase of the capacitor bank, calculating a magnitude of an unbalanced current based on the measured currents, measuring a voltage of each individual phase of the capacitor bank, calculating a magnitude of an unbalanced voltage based on the measured voltages, determining an operating point location in a specified operating region based on the calculated magnitudes of the unbalanced current and the unbalanced voltage, and initializing a trip signal based on the location of a defined operating point in the specified operating region, wherein the specified operating region is a part of an operating plane defined by the first quadrant of a two-dimension Cartesian coordinate system having an X axis and a Y axis representing unbalanced voltage and current, the operating plane is divided into a restraining region and the specified operating region by a limit line, in the case that the defined operating point is in the restraining region, no trip signal is initialized; and wherein the capacitor bank has rated current and voltage, the X-axis of the operating plane defined by percent of the magnitude of the rated voltage of the capacitor bank and the Y-axis of the operating plane defined by percent of the magnitude of the rated current, the limit line includes a part of a straight line extending through the origin of the plane with a slope of 1.

2. The method according to claim 1, wherein the limit line is specified so that the operating region has a distance to the origin of the coordinate system.

3. The method according to claim 1, wherein the unbalanced current is any of following unbalanced quantities: negative sequence current, zero sequence current or $\Delta I = I_{max} - I_{min}$, wherein the unbalanced voltage is any of following unbalanced quantities: negative sequence voltage, zero sequence voltage or $\Delta U = U_{max} - U_{min}$, and the operating point is defined by the unbalanced quantities in the same category.

4. The method according to claim 1, wherein a plurality of capacitor units are arranged in a rack and the capacitor bank comprises a plurality of capacitor racks connected to each other, and the method is adapted to protect the capacitor bank from failures occurring between two capacitor racks.

5. The method according to any of claim 1, wherein the method further comprises the steps of:

defining a no-action region within the operating region and adjacent to the limit line, defining a first sensitive region within the operating region and adjacent to the no-action region, and initializing a trip signal with a first time delay in the case that the operating point is located in the first sensitive region.

6. The method according to claim 5, wherein the method further comprises the steps of:

defining a second sensitive region within the operating region and adjacent to the first sensitive region, and initializing a trip signal with a second time delay shorter than the first time delay in the case that the operating point is located in the second sensitive region.

7. The method according to claim 6, wherein the first time delay is in a range of 100-300 ms and the second time delay is in a range of 20-50 ms.

8. An arrangement for protecting against a failure within a multi-phase capacitor bank comprising a plurality of capacitor units each comprising a plurality of capacitor elements connected to each other, wherein capacitor units are connected to each other, the arrangement comprising:

a current transformer arranged to measure the current flowing through each individual phase of the capacitor bank, a voltage transformer arranged to measure the voltage of each individual phase of the capacitor bank, a computing unit configured to, calculate a magnitude of an unbalanced current based on the measured currents, and calculate a magnitude of an unbalanced voltage based on the measured voltages, and a protective unit configured to, determine an operating point location in a specified operating region based on the calculated a magnitudes of the unbalanced current and the unbalanced voltage, and initialize a trip signal based on the location of the operating point in the specified operating region, wherein the specified operating region is a part of an operating plane defined by the first quadrant of a two-dimension Cartesian coordinate system having an X axis and a Y axis representing unbalanced voltage and current, the operating plane is divided into a restraining region and the specified operating region by a limit line, in the case that the defined operating point is in the restraining region, no trip signal is initialized; and wherein the capacitor bank has rated current and voltage, the X-axis of the operating plane defined by percent of the magnitude of the rated voltage of the capacitor bank and the Y-axis of the operating plane defined by percent of the magnitude of the rated current, the limit line includes a part of a straight line extending through the origin of the plane with a slope of 1.

9. The arrangement according to claim 8, wherein the protective unit is further configured to, define a no-action region within the operating region and adjacent to the limit line, define a first sensitive region within the operating region and adjacent to the no-action region, and initialize a trip signal with a first time delay in the case that the operating point is located in the first sensitive region.

10. The arrangement according to claim 9, wherein the protective unit is further configured to, define a second sensitive region within the operating region and adjacent to the first sensitive region, and initialize a trip signal with a second time delay shorter than the first time delay in the case that the operating point is located in the second sensitive region adjacent to the first sensitive region.

11. A system for protecting against a failure within a capacitor bank having a rated current and voltage, said capacitor bank comprising a plurality of capacitor units each comprising a plurality of capacitor elements connected to each other, the system comprising:

a current transformer measuring the current through each individual phase of the capacitor bank;

a voltage transformer measuring the voltage of each individual phase of the capacitor bank;

a computing unit, said computing unit calculating a magnitude of an unbalanced current based on the measured currents, and said computing unit calculating a magnitude of an unbalanced voltage based on the measured voltages;

a protective unit determining an operating point location in a specified operating region based on the calculated magnitudes of the unbalanced current and the unbalanced voltage, said protective unit initializing a trip signal based on the location of the operating point in the specified operating region;

said specified operating region includes an operating plane defined by a first quadrant of a coordinate system having an X-axis and a Y-axis representing unbalanced voltage and current, the X-axis of the operating plane defined by percent of the magnitude of the rated voltage of the capacitor bank and the Y-axis of the operating plane defined by percent of the magnitude of the rated current; and wherein the operating plane is divided into a restraining region and the specified operating region by a limit line that includes a part of a straight line extending through an origin of the coordinate system with a slope of 1.

12. The system according to claim 11, wherein the unbalanced current is any of following unbalanced quantities: negative sequence current, zero sequence current or $\Delta I = I_{max} - I_{min}$, wherein the unbalanced voltage is any of following unbalanced quantities: negative sequence voltage, zero sequence voltage or $\Delta U = U_{max} - U_{min}$, and the operating point is defined by the unbalanced quantities in the same category.

13. The system according to claim 11, wherein the operating region further includes a no-action region adjacent to the limit line, and a first sensitive region within the operating region and adjacent to the no-action region, wherein said protective unit initializes the trip signal with a first time delay when the operating point is located in the first sensitive region.

* * * * *